United States Patent
Perry et al.

(10) Patent No.: US 7,953,913 B2
(45) Date of Patent: May 31, 2011

(54) PERIPHERAL DEVICE LOCKING MECHANISM

(75) Inventors: Nir Perry, Holon (IL); David Landsman, Mercer Island, WA (US)

(73) Assignee: Sandisk IL Ltd., Kfar Saba (IL)

( * ) Notice: Subject to any disclaimer, the term of this patent is extended or adjusted under 35 U.S.C. 154(b) by 0 days.

(21) Appl. No.: 12/100,917

(22) Filed: Apr. 10, 2008

(65) Prior Publication Data

US 2009/0259784 A1    Oct. 15, 2009

(51) Int. Cl.
*G06F 12/00* (2006.01)
*G06F 13/00* (2006.01)

(52) U.S. Cl. .................. 710/200; 710/260; 711/152

(58) Field of Classification Search .......... 710/10, 710/300, 110, 200, 260–263, 266, 268, 269; 711/152, 163, 164, 166

See application file for complete search history.

(56) References Cited

U.S. PATENT DOCUMENTS

| | | | |
|---|---|---|---|
| 6,031,757 A * | 2/2000 | Chuang et al. | 365/185.04 |
| 6,098,144 A * | 8/2000 | De Oliveira et al. | 710/269 |
| 6,154,819 A * | 11/2000 | Larsen et al. | 711/163 |
| 6,223,284 B1 | 4/2001 | Novoa et al. | |
| 6,731,536 B1 * | 5/2004 | McClain et al. | 365/185.04 |
| 6,990,026 B2 * | 1/2006 | Yagi | 365/195 |
| 7,043,581 B1 * | 5/2006 | Gulick | 710/240 |
| 7,069,452 B1 | 6/2006 | Hind et al. | |
| 7,284,697 B2 * | 10/2007 | Vanzini et al. | 235/380 |
| 7,418,545 B2 * | 8/2008 | Marushak et al. | 711/112 |
| 2002/0157010 A1 * | 10/2002 | Dayan et al. | 713/191 |
| 2003/0149851 A1 | 8/2003 | Shiota et al. | |
| 2003/0154392 A1 | 8/2003 | Lewis | |
| 2003/0159056 A1 * | 8/2003 | Cromer et al. | 713/193 |
| 2006/0080517 A1 | 4/2006 | Brown | |
| 2008/0046997 A1 * | 2/2008 | Wang | 726/16 |
| 2008/0244252 A1 * | 10/2008 | Rothman et al. | 713/1 |

FOREIGN PATENT DOCUMENTS

WO     WO 2004/084231     9/2004

OTHER PUBLICATIONS

Partial Search Report dated Jul. 6, 2009 in PCT Application No. PCT/US2009/038821.
International Search Report dated Oct. 6, 2009 in PCT Application No. PCT/US2009/038821.
Written Opinion dated Oct. 6, 2009 in PCT Application No. PCT/US2009/038821.
Iida et al., "Method of LSI Personalization After Resetting," IP.com Journal, IP. Com, Inc., West Henrietta, NY, US, Dec. 1, 1984, 3 pgs.

* cited by examiner

*Primary Examiner* — Khanh Dang
(74) *Attorney, Agent, or Firm* — Beyer Law Group LLP

(57) ABSTRACT

A computing system having a host device and at least one client device having a lock used to prevent modification of data in the client device. A lock clear signal from the host device causes the client device to clear a lock used to prevent modification of data stored in at least a protected portion of the client device where the client device remains fully operational.

35 Claims, 5 Drawing Sheets

PERIPHERAL DEVICE LOCKING MECHANISM

FIELD OF THE INVENTION

The present invention relates generally to digital devices. More particularly, the present invention relates to protecting the integrity of information stored in a peripheral device using a selective locking mechanism.

BACKGROUND

The issue of computer security concerns has been multiplied by the recent explosion in the widespread implementation and availability of computer-based systems, over a variety of platforms. Advances in computer and integrated circuit manufacturing technologies have permitted the widespread deployment of powerful portable computers, commonly referred to as "notebook" or "laptop" computers. A still-smaller type of computer system that has become popular is the personal digital assistant (PDA), operating according under the PALM, Windows Mobile (WM) or other operating systems. Many additional electronic devices also now can be considered to be computer systems. For example, modern wireless telephone handsets are effectively computer systems, under the control of a microprocessor or microprocessor-like central processing unit that accesses local memory. Especially when implemented into the so-called 2.5 G and 3 G wireless services, these modern wireless telephone handsets carry out computer-like functions including Internet browsing, email functionality, and the like. Other non-traditional computer platforms include Internet appliances, web pads, biometrics, medical devices and the like. These new computer platform implementations and their increased connectivity to the Internet, especially using wireless technology, are also vulnerable to security attacks, in some ways more so than conventional desktop computer workstations.

Conventional "bootloader" routines are commonly used in modern computer systems, in virtually all platforms. A typical bootloader is a sequence of instructions for system initialization. The bootloader sequence is typically maintained in "firmware", such as electrically-alterable or hard-coded read-only memory (ROM) in which the stored data persists after power-down. Upon power-up or system reset, the bootloader sequence is executed by the central processing unit (CPU), to transfer operating system code from another persistent store (e.g., a hard disk drive in a conventional computer, or non-volatile memory in a portable device) into system program memory for execution. The bootloader then passes control to this operating system code. In certain flash non-volatile memories of the prior art, it has been customary to provide a "write protect" pin associated with a memory chip package to prevent program and erase operations to certain locations, such as a boot block sector (a sector in a flash memory device is simply a partition of the memory array itself). It is desirable to protect some of these sectors against intentional or malicious program and erase operations. For example, the sectors storing the boot code, the configuration data, the operating system, and the main program code would most likely need to be protected. If any of these sectors were to be inadvertently erased or programmed with erroneous information, then the system would not function properly. The sectors allocated for user data storage are less critical and would not have an impact on the basic system operation if they were erased and reprogrammed, so they would most likely not need to be protected. In general, security breaches in the nature of malware (i.e., viruses, worms, "bot" or "zombie" operation, and the like) have exacted a significant economic cost on modern communications and computing systems. As the number of mobile devices grows, the possibility of serious security breaches will also increase.

Therefore providing security in a computing system is desired.

SUMMARY OF THE DESCRIBED EMBODIMENTS

According to different embodiments of the present invention, various methods, devices and systems for efficiently providing security in a computing system are described. One embodiment describes a method performed in a computing system having a host device and at least one client device for clearing a lock used to prevent modification of data in the client device. The method includes at least the following operations: receiving a lock clear signal from the host device at the client device and using the received lock clear signal by the client device to clear a lock used to prevent modification of data stored in at least a protected portion of the client device, wherein the client device remains fully operational.

A computing system is described that includes a client device in communication with the host device. The client device is arranged to receive a lock clear signal from the host device and use the received lock clear signal to clear a lock used to prevent modification of data stored in at least a protected portion of the client device, wherein the client device remains fully operational A computing system is described that includes at least a host device; at least one signal line connected to the host device and a plurality of client devices. Each of the client devices includes a number of I/O pins selected ones of which are connected to the at least one signal line, and a first and a second pin where all but a first and a last of the plurality of client devices are connected to one another in a daisy chain arrangement by way of the first and the second pin separate from the at least one signal line. At least the first client device is a bootable client device that is connected to the daisy chain arrangement only by way of the second pin and where the first pin of the first device is a lock clear pin that is connected to a reset pin of the host computer by way of a reset line. The last client device is connected to the daisy chain only by way of a first pin and wherein a second pin of the last of the plurality of client devices is connected to the host computer by way of an interrupt signal line separate from the at least one signal line, wherein when the reset pin of the host computer is asserted, then the first client device clears a lock used to prevent modification of data stored in at least a protected portion of the bootable client device, wherein the bootable client device does not undergo any initialization process.

BRIEF DESCRIPTION OF THE DRAWINGS

FIG. 3 shows a simplified state machine 300 representative of client device of system shown in FIG. 1.

DETAILED DESCRIPTION OF THE DESCRIBED EMBODIMENTS

Figure 1:
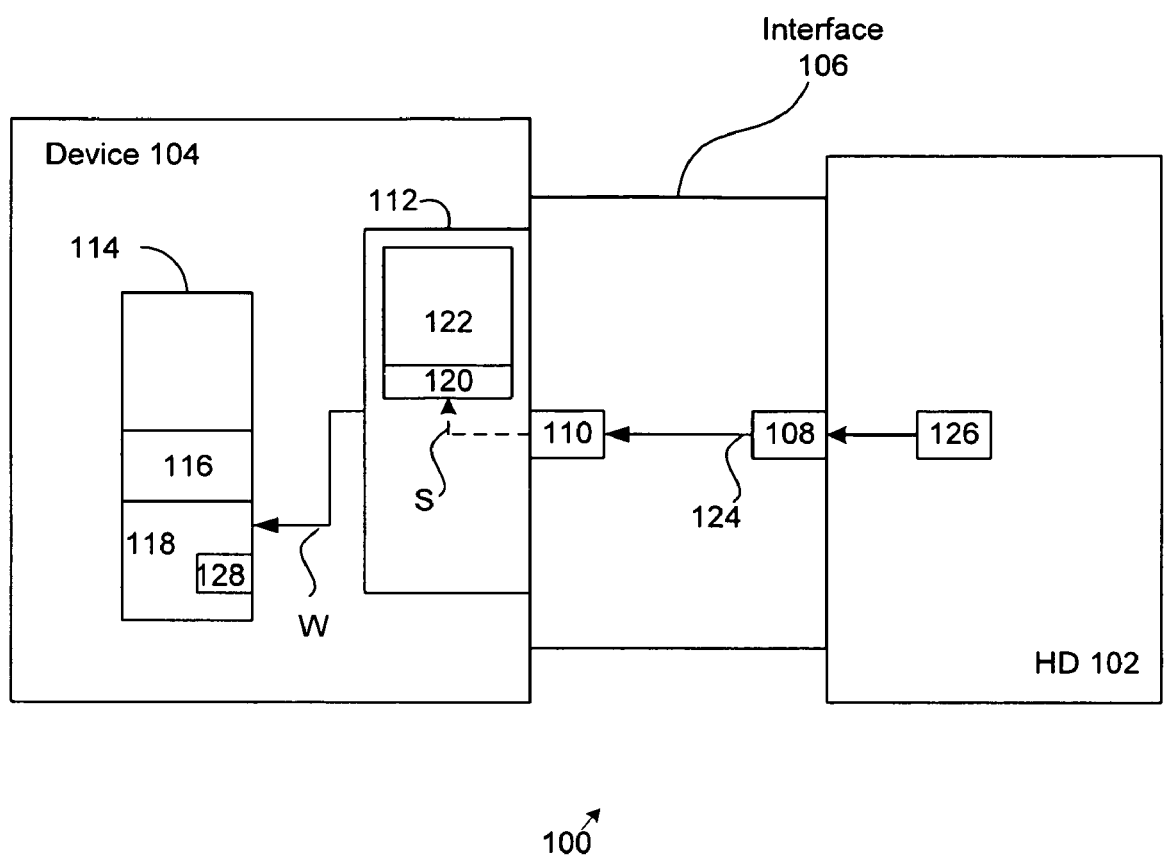
FIG. 1 shows a system illustrating a specific embodiment of the invention

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

Most peripheral devices (as well as Host Devices, or HD) include a reset pin that allows resetting the peripheral device to its initial state. In some conventional security systems, the reset pin of the HD and the peripheral device(s) are tied together. In this way, when the HD is reset, all peripheral devices are also reset. In some cases, certain peripheral devices include a temporary locking mechanism that provides some protection for certain data stored therein or for certain functional modules included therein. In such cases, it is often desirable to clear any locks upon reset. In this way, the HD can request that a lock be maintained on a particular peripheral device until such time as the system is reset. This arrangement is typically used in booting scenarios where data (boot image code) is protected after the boot loader has completed booting. The boot image code remains protected as long as the memory in which it is stored remains locked (until a system reset i.e., reboot occurs). In this way, the boot loader alone can update its own data in order to, for example, fix bugs, update firmware, etc.

Conventional approaches to unlocking a peripheral device includes the use of a dedicated peripheral device reset pin that is either tied to the same source as the HD reset pin or to an external reset pin on the HD that signals the associated peripheral devices when to reset. In some cases, in order to mitigate some of the deleterious effects of resetting a peripheral device in order to clear the lock, a warm-reset pin is used in order to signal the peripheral device to perform a partial re-initialization to clear the lock. Even in this case, however, a substantial amount of overhead is required. In still other cases, software can provide a command or sequence of instructions that can be used to clear the lock. However, this approach is vulnerable to attack thereby defeating the purpose of providing the lock in the first place.

In any case, relying on a reset pin is not an optimal solution since the peripheral device can take a substantial amount of time to re-initialize. Moreover, the act of resetting the peripheral device may also shorten the functional lifetime of the device if performed too often. The invention circumvents these problems by providing a lock reset pin also referred to as a lock clear pin. Instead of forcing the peripheral device to go through a full, or even a partial re-initialization, the lock reset pin allows the peripheral device to only clear its internal lock while the peripheral device continues to operate as normal. The clearing of the lock can be accomplished either directly by use of hardware or by triggering the clearing of the lock using firmware activated by a uni-directional lock command that can take the form of instructions provided by software or a signal provided by the HD. In this way, the lock reset pin together with the uni-directional lock command can be considered to be a "sticky lock" protection mechanism that can be used to protect data on storage devices or any other functionality in a peripheral device while minimizing the need for the peripheral device to undergo even a partial re-initialization.

For example, using the sticky lock protection mechanism, the HD can lock a function or area in order to provide protection against a remote attack. In this arrangement, the HD has no command or interface to clear the lock without resetting itself. Since the lock command is uni-directional in nature, even if the security of the HD has been successfully breached by malware such a virus, the protected functionality/area cannot be unlocked. The only way for the HD to access the protected function/area is to associate a mark with the protected function/area that can be subsequently used by the HD after having been reset to identify the protected function/area. Once such a mark is set, the HD (and all associated peripheral devices) can reset itself. In the next session, the HD can spot the mark prior to again locking the function/area. In this way, remote attacks can be blocked since once the HD is reset, any virus or attacker tool are deleted from the HD CPU.

The storage device discussed herein may be compatible with any memory card format, such as a secured digital (SD) memory card format used for managing digital media such as audio, video, or picture files. The storage device may also be compatible with a multi media card (MMC) memory card format, a compact flash (CF) memory card format, a flash PC (e.g., ATA Flash) memory card format, a smart-media memory card format, or with any other industry standard specifications. One supplier of these memory cards is SanDisk Corporation of Milpitas, Calif. The nonvolatile memory retains its memory or stored state even when power is removed. The storage device may also apply to other erasable programmable memory technologies, including but not-limited to electrically-erasable and programmable read-only memories (EEPROMs), EPROM, MRAM, FRAM ferroelectric and magnetic memories. Note that the storage device configuration does not depend on the type of removable memory, and may be implemented with any type of memory, whether it being a flash memory or another type of memory. The storage device may also be implemented with a one-time programmable (OTP) memory chip and/or with a 3 dimensional memory chip technology.

Host systems with which such memory cards are used include cellular telephones, personal computers, notebook computers, hand held computing devices, cameras, audio reproducing devices, and other electronic devices requiring removable data storage. Flash EEPROM systems are also utilized as bulk mass storage embedded in host systems. The storage device may be part of a local proxy system that may be implemented on PDAs (Personal Digital Assistants), mobile handsets, and other various electronic devices. A PDA is typically known as a user-held computer system implemented with various personal information management applications, such as an address book, a daily organizer, and electronic notepads, to name a few.

The invention will now be described in terms of specific embodiments all of which are in keeping with the spirit and scope of the invention. It should be noted that any functional blocks or functional arrangements described herein can be implemented as either a physical entity or as a logical entity, or as a combination of both.

FIG. 1 shows a system 100 illustrating a specific embodiment of the invention. System 100 can include host device (HD) 102 connected to or otherwise in communication with device 104 by way of interface 106. It should be noted that HD 102 includes a processor, however, for the sake of clarity, the processor included in HD 102 is neither shown nor mentioned further in this discussion but is, nonetheless, presumed to be present. HD 102 includes at least one output pin 108 that can be used by HD 102 as a reset pin 108 to communicate with device 104 at lock clear pin 110 by way of interface 106. It should be noted that interface 106 can be configured as a mechanical entity (such as a socket or interconnecting bus) into which HD 102 and device 104 can mechanically connect. In some embodiments, interface 106 can take the form of a wireless interface. It is contemplated that device 104 can take many forms such as a storage device (SD), peripheral device (PD), etc. In the case where device 104 is a peripheral device, then PD 104 includes a storage area used to store relevant data such as firmware, etc. that must be protected. In the case where device 104 is a storage device, SD 104 can be used by HD 102 to store code used by HD 102 (such as boot image code) that also must be protected against attack.

In any case, it will be presumed for the remainder of this discussion that device 104 takes the form of storage device 104 without any loss in generality or applicability of the invention. Accordingly, as a storage device, storage device 104 can take the form of removable memory devices such as a memory card having a relatively small form factor and can be used to store digital data for electronics products such as cameras, hand-held or notebook computers, network cards, network appliances, set-top boxes, hand-held or other small audio players/recorders (e.g., MP3 devices), and medical monitors. Examples of a memory card include PC Card (formerly PCMCIA device), Flash card (e.g., Compact Flash Type I and II), Secure Digital (SD) card, Multimedia card (MMC), ATA card (e.g., Compact Flash card), memory stick, SmartMedia card. In addition, LSD 204 can take the form of non-removable memory devices such as SD compatible iNAND™ embedded Flash drive manufactured by SanDisk Corporation of Milpitas Calif.

Storage device 104 can include controller 112 and data storage area 114. Data storage area 114 can be logically arranged to include at least mass storage area 116 managed by HD 102 using interface 106. In a particularly useful arrangement, mass storage area 116 can be a LBA based mass storage area. Mass storage area 116 can be logically partitioned to include protected area 118. Protected area 118 can be used to store data (such as boot image code) to be protected. Data in protected area 118 can be protected by prohibiting any modifications (i.e., write, erase, etc.) of any data stored within memory space associated with protected area 118. Such modification prohibition can be facilitated by activating internal locking mechanism 120 included in firmware 122 executed by controller 112. In this way, when internal locking mechanism 120 is active, any modification command directed to the memory space corresponding to protected area 118 can not be executed by controller 112. Only by releasing, or clearing, active internal locking mechanism 120, can any modification command W directed at the memory space associated with protected area 118 be executed by controller 112. In this way, any data stored in protected area 118 can be protected against malware such as viruses, worms, etc as well as corrupting the data in general by, for example, erasing portions thereof.

It should be noted that lock clear pin 110 can be used to clear any active internal locking mechanism 120 without (unlike conventional arrangements) resetting storage device 104 which, however, may be initialized if deemed necessary. Lock clear pin 110 can cause locking mechanism 120 to clear either directly (signal S) or indirectly by triggering internal firmware 122 included in controller 112. In any case, in order to clear locking mechanism 120, HD 102 provides (uni-directional) reset signal 124 at reset pin 108 based upon lock clear command 126 provided by HD 102. Locking mechanism 120 can be cleared without resetting storage device 104. In this way, lock clear command 126 can be used together with the uni-directional reset signal 124 to protect data stored in protected area 118 against remote attacks while still enabling access by HD 102 to storage device 104 in order to provide, for example, software or other updates, etc.

It should be noted that at any point after power up, HD 102 can request storage device 104 to lock a function (in a peripheral device) or a designated storage area (such as storage area 118) in a storage device using locking mechanism 120. Once the designated function or storage area is locked, the function (or any data) so protected can not be modified. In the described embodiment, HD 102 can also provide persistent mark 128 used to subsequently identify a protected data storage area or function. For example, if HD 102 has caused storage device 104 to lock protected memory area 118, then HD 102 can also mark protected area 118 with persistent mark 128. Persistent mark 128 can be used (after a system reset and prior to being re-locked) by HD 102 to identify data stored in area 118, for example, to be modified prior to the re-activation of locking mechanism 120 subsequent to a system reset (i.e., HD 102 resetting itself) which clears all locks. For example, after a system reset, upon restarting, HD 102 can look for any set persistent markers and update any associated function/area prior to activating locking mechanism 120. In this way, HD 102 can protect a function in a peripheral device or data stored in a storage device from a remote attack since once HD 102 is reset, any virus or attacker tool is deleted from HD 102.

Figure 2:
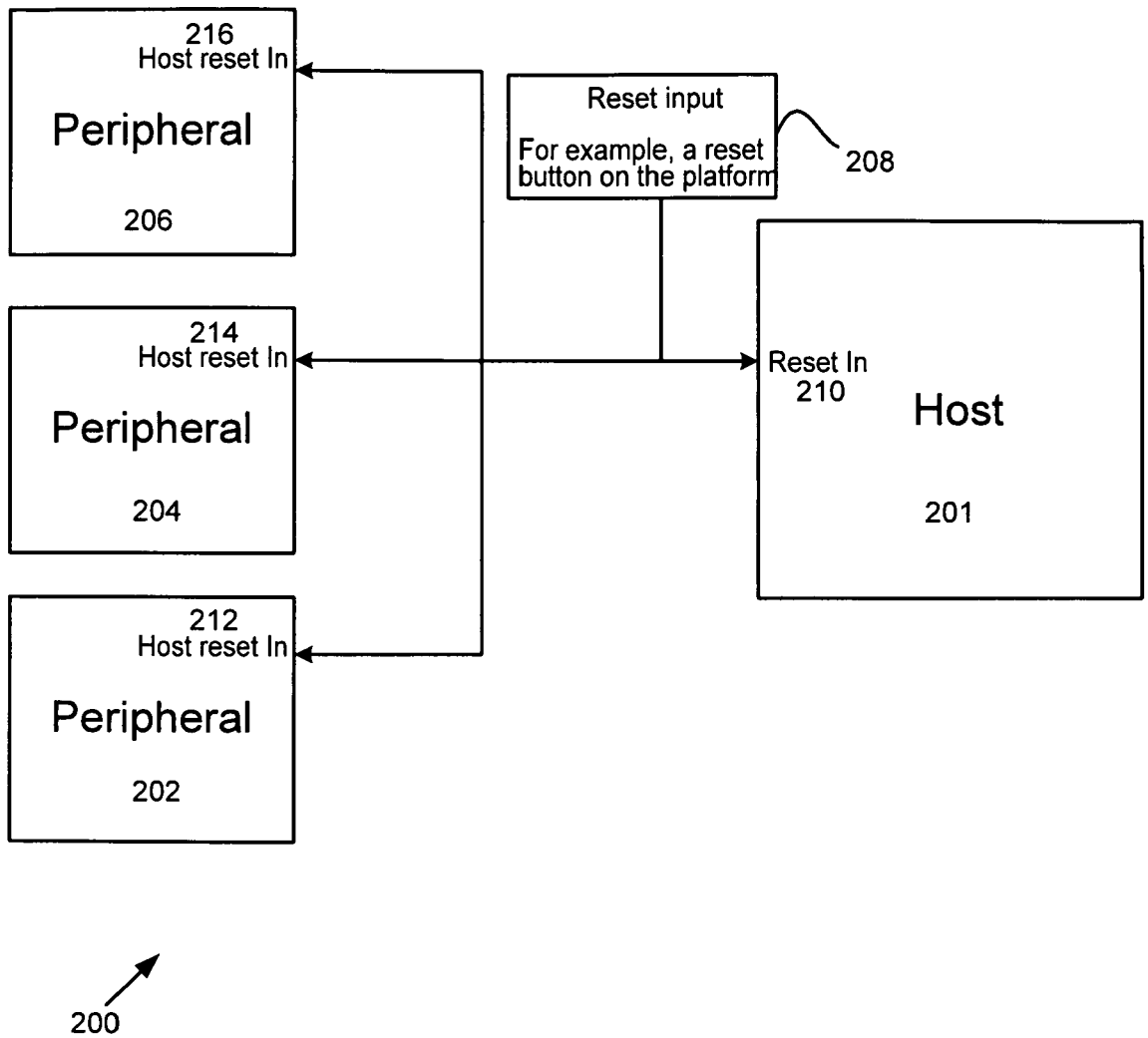
FIGS. 2 and 3 illustrate additional configurations of system shown in FIG. 1 used to implement the invention.
Figure 3:
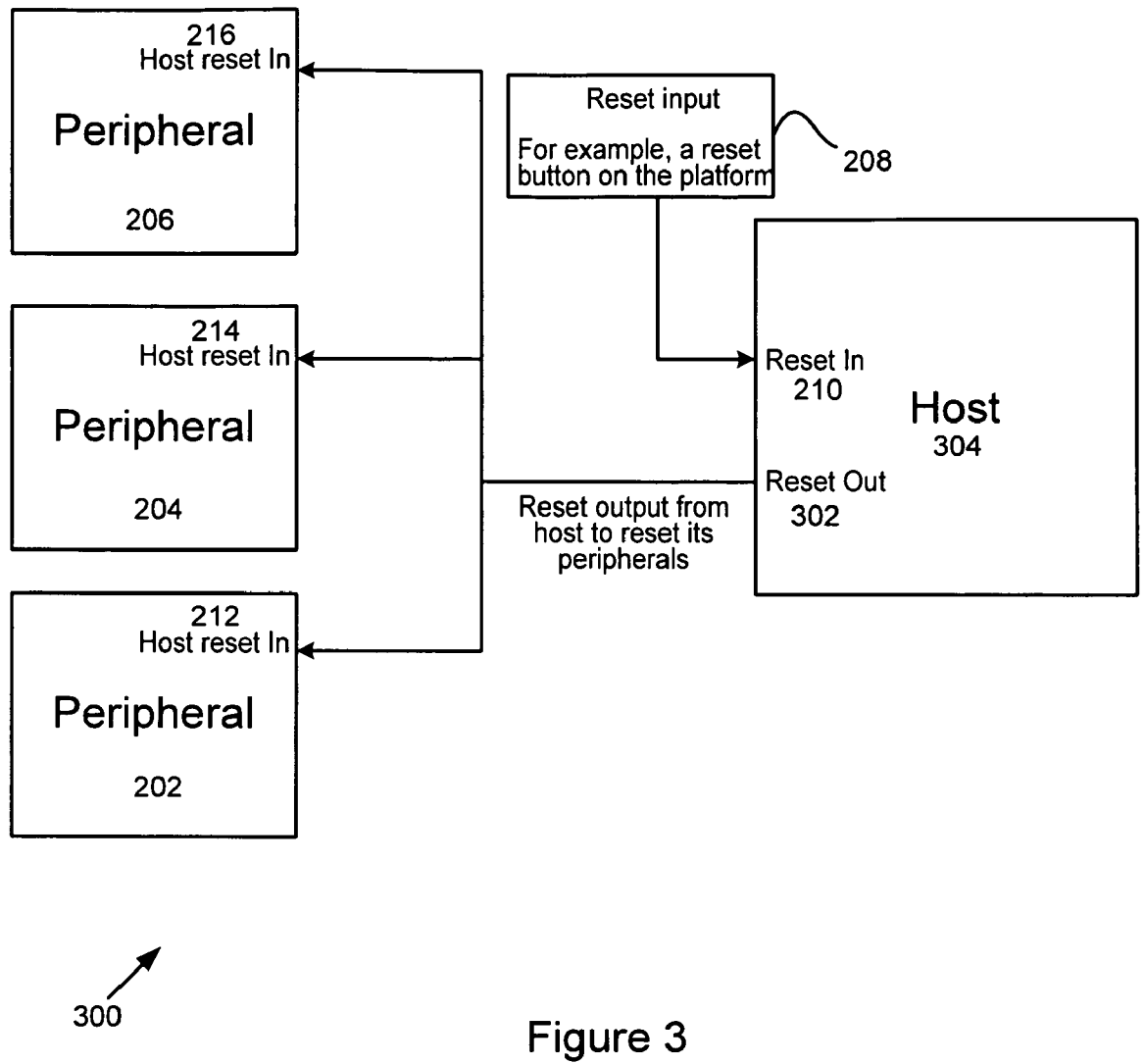

FIGS. 2 and 3 illustrate additional configurations of system 100 used to implement the invention. For example, FIG. 2 shows system 200 in accordance with another embodiment of the invention. System 200 includes HD 201 connected to a number of peripheral devices (PD) 202-206. External reset switch 208 is connected to reset pin 210 of HD 201 and lock clear pins 212, 214, and 216 of PD 202-206, respectively. In this way, when a lock clear is generated by HD 201 and PD 202-206 are cleared at the same time. It should be noted that as described above, lock clear pins 212-214 are not conventional reset pins as they each accept any received reset signal as a lock clear signal that does not reset the associate peripheral device (or storage device).

FIG. 3 illustrates system 300 where reset pins 212-216 of PD 202-206 are each connected to reset output pin 302 of HD 304 (in contrast to the direct connection shown in FIG. 2). In this way, a soft reset can be generated by software executed by HD 304. It should be noted that as described above, lock clear pins 212-214 are not conventional reset pins as they each accept any received reset signal as a lock clear signal that does not reset the associate peripheral device (or storage device). In any case, however, the associated peripheral device may be initialized if needed.

Figure 4:
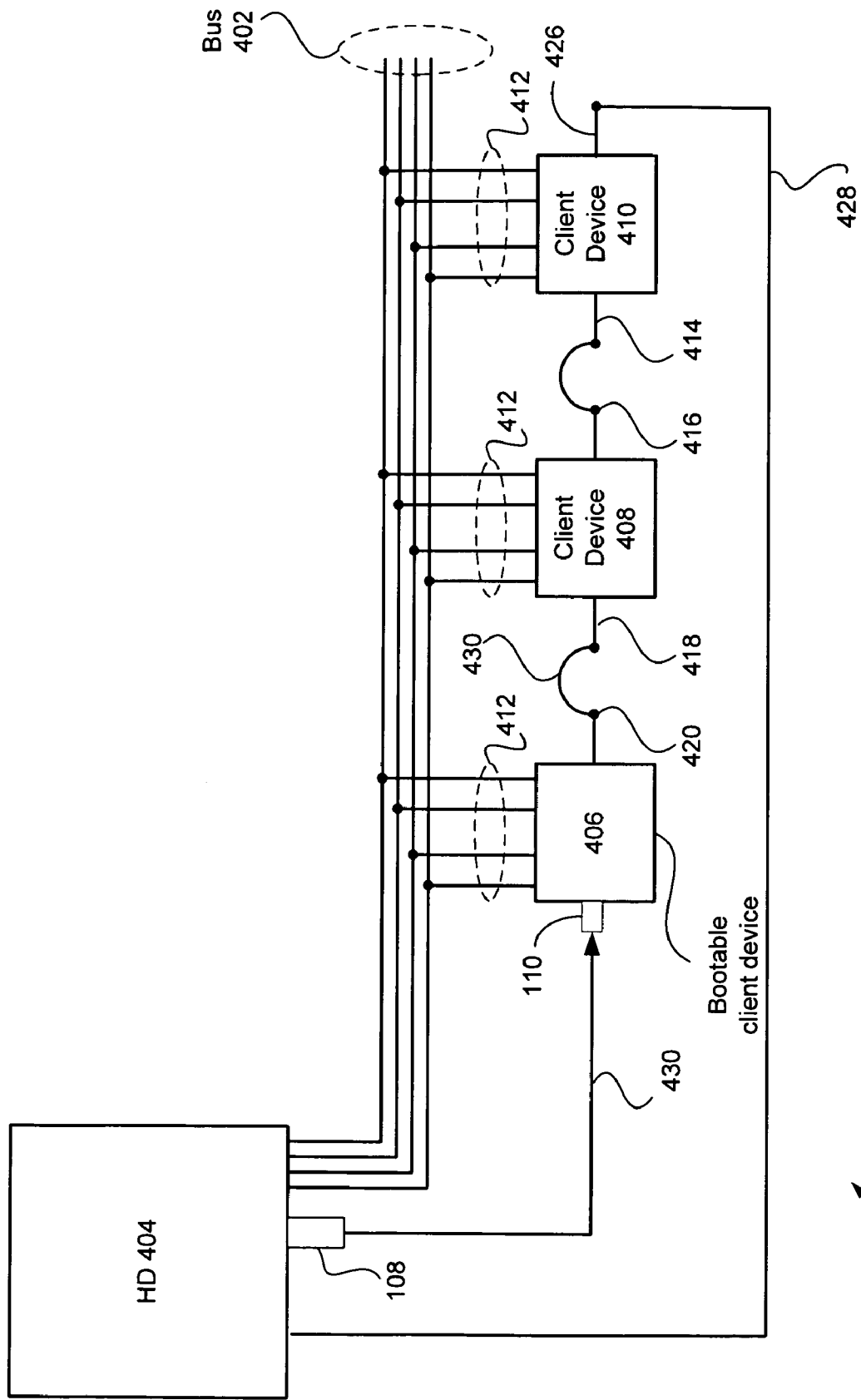
FIG. 4 shows a simplified wiring diagram of a system according to another embodiment of the present invention.
Figure 5:
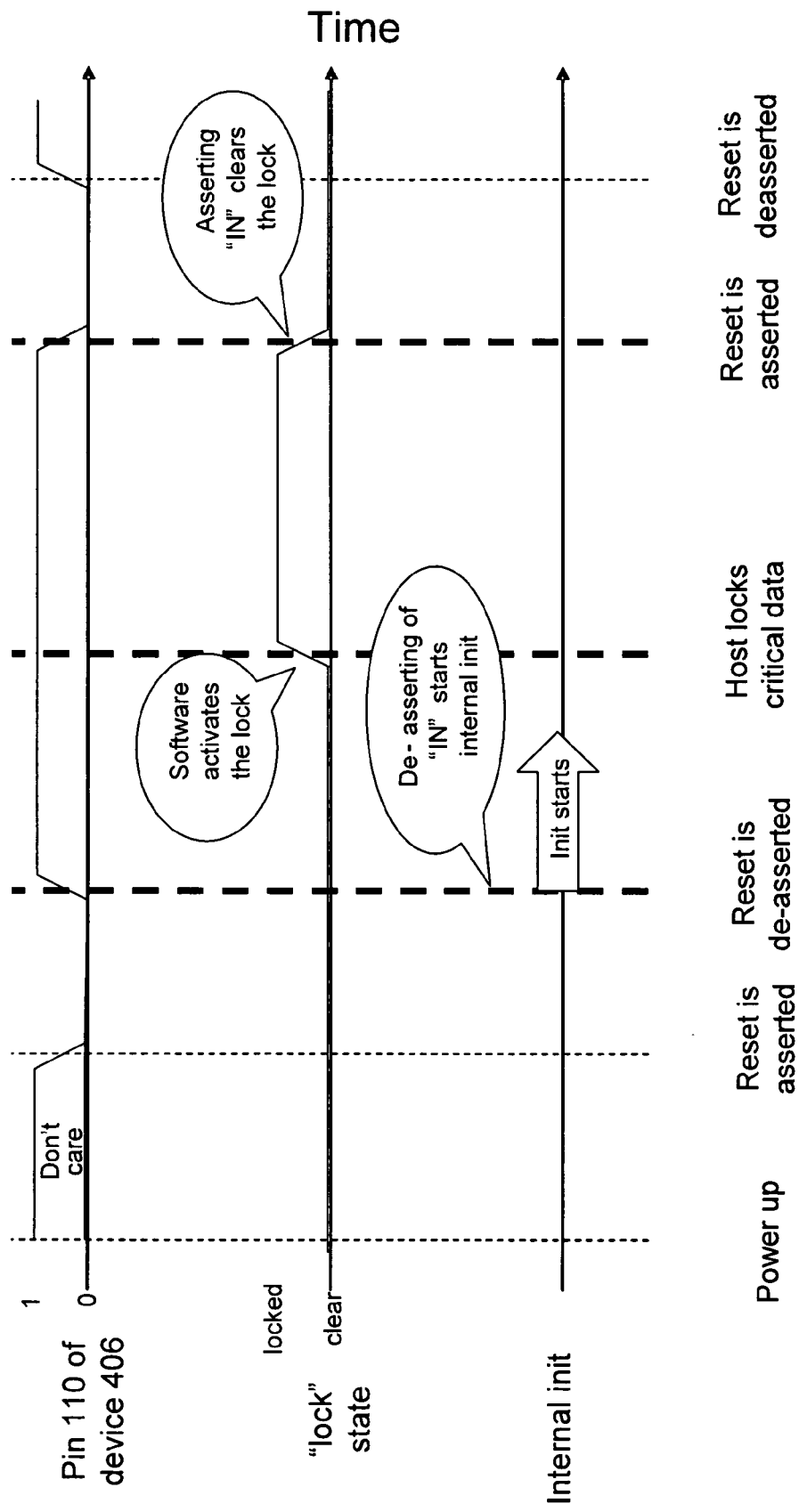
FIG. 5 illustrates a timing diagram in accordance with the invention.

Additional embodiments of the invention are discussed below with reference to FIGS. 4-5. The additional embodiments take advantage of a bus architecture and circuit design described in co-pending U.S. patent application Ser. No. 11/927,108, filed Oct. 29, 2007 and entitled "Addressing Multiple Devices on a Shared Bus" by Zatelman et al. and co-pending U.S. patent application Ser. No. 11/928,110, filed Oct. 30, 2007 and entitled "Signaling an Interrupt Request Through Daisy Chained Devices" by Perry et al each of which are incorporated by reference for all purposes. However, those skilled in the art will readily appreciate that the detailed description given herein with respect to FIGS. 4-5 is for explanatory purposes as the invention extends beyond these limited embodiments. It should be noted that the first and second pins can in some embodiments operate as first and second interrupt pin used to facilitate passing of interrupt information between the client devices. However, in the context of this discussion, at least a first device in a group of daisy chained devices is a bootable device having a first pin that takes the form of a lock clear pin arranged to receive a uni-directional lock command along the lines described above.

FIG. 4 shows a simplified wiring diagram of a system 400 according to additional embodiments of the present invention. The system 400 includes a number of signal lines 402

(referred to as bus 402) used to connect host device (HD) 404 to a plurality of client devices 406, 408, and 410 (that can take the form of, for example, memory storage devices such as a secure digital (SD) memory card). It should be noted that even though only three client devices (406, 408 and 410) are shown, it can be appreciated that there can be any number of client devices in system 400. Each of the client devices includes a number of I/O pins 412 selected ones of which are used to electrically connect an associated one of the client devices to bus 402. In addition to I/O pins 412, each client device includes at least a first and a second pin that can be used together to pass information from one client device to another such as signifying an interrupt status of an associated client device. In the described embodiment, first and second pins can be used to connect a first client device that takes the form of bootable client device 406 to client devices 408 and 410 in a daisy chain arrangement separate from bus 402. By daisy chain arrangement, it is meant that a first (input) pin of one client device is electrically connected to a second (output) pin of a neighboring client device.

It should be noted that bootable client device 406 can include lock clear pin 110 arranged to receive lock clear signal (as UN-SET, or LOW) provided by HD 404 at reset pin 108 by way of host reset line 430 as well as be set to a SET value (or HIGH). In this way, lock clear pin 110 can be used to facilitate initialization described in co-pending U.S. patent application Ser. No. 11/928,110 as well as facilitate a sticky locking mechanism that is subject of the instant patent application. Therefore, by allocating a dual use to the first pin of first bootable device 406, no additional pins are necessary for client device 406 thereby greatly reducing costs over that that would otherwise be required. Another of the advantages provided by the arrangement of FIG. 4 is that since client device 406 is a bootable client device, any boot sequence initiated by HD 404 can ignore any of the other client devices (i.e., 408 and 410) connected in a daisy chain arrangement with first bootable client device 406. It is important to note that when HD 404 is reset and lock clear pin 110 is asserted, client device 406 only clears its lock and does not result in the resetting of client device 406. In this way, client device 406 will continue to operate as normal and the assertion of pin 110 only triggers an event used to clear the lock.

FIG. 5 shows a timing diagram 500 in accordance with an embodiment of the invention. During operation, when reset is not asserted and HD 404 is operational, pin 110 is at SET indicating that client device 406 is active and able to communicate with bus 402. However, when HD 404 is in a reset state, then pin 110 is asserted (i.e., NOT-SET or LOW) and no commands can be sent on bus 402. When device 406 determines that pin 110 has been asserted (i.e., LOW), then device 406 clears the lock. It should be noted that device 406 can clear the lock at any appropriate time after pin 110 has been asserted. For example, device 406 can clear the lock at the end of the low state of pin 110 or after a predetermined length of time after pin 110 has been asserted). By connecting pin 110 to host reset line 430, client device 406 can detect if it is connected to reset logic and therefore deduce that HD 404 is in a reset state. By detecting the reset logic, device 406 can start its own internal initialization without waiting for instructions from HD 404. In this way, the time it takes HD 404 to start operating, get to the driver of device 406, and for device 406 to start its own initialization can be saved. This savings in time can substantially reduce boot time when client device 406 is the boot device.

Although the invention has been described using embodiments based upon a daisy chain type bus architecture having a lock clear pin separate from the bus, the invention is well suited for other types of bus architectures. Such bus architectures include those configure to pass an interrupt from one device to another (regardless of the manner in which the interrupt is passed) and remember that an interrupt has passed through them (in order to facilitate a subsequent interrupt search, using for example, a binary search).

It should be noted that it is contemplated that the invention can be used for any type client device or any mix of types of client devices. For example, the client devices can include data storage devices, communications devices, sensing devices, and the like that can be either removable or fixed in nature. Such devices can include SDIO (Input/Output) cards used as an interface that extends the functionality of devices with SD card slots such as Bluetooth®, GPS, and WiFi (802.11b,g), etc. Data storage devices can include non-volatile memory such as Multi Media Card (MMC) and Secure Digital Card (SD). These devices can also be grouped according to whether or not they generate interrupts (SDIO devices, for example) or do not generate interrupts (SD memory devices, for example). In this way, searching for any interrupt sources can be made for efficient in both time and computing resources.

The invention can further pertain to an electronic system that includes a memory system as discussed above. Memory systems (i.e., memory cards) are commonly used to store digital data for use with various electronics products. The memory system is often removable from the electronic system so the stored digital data is portable. The memory systems according to the invention can have a relatively small form factor and be used to store digital data for electronics products that acquire data, such as cameras, hand-held or notebook computers, network cards, network appliances, set-top boxes, hand-held or other small media (e.g., audio) players/recorders (e.g., MP3 devices), and medical monitors.

The many features and advantages of the invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method, comprising:
at a client device:
receiving a uni-directional lock clear signal from a host device at a lock reset pin of the client device, the uni-directional lock clear signal asserting the lock reset pin;
triggering a lock clear operation by the assertion of the lock reset pin, the lock clear operation executed only by client device processing resources, wherein the lock clear operation clears a lock used to prevent modification of data stored in at least a protected portion of the client device, wherein the client device remains fully operational during the lock clear operation;
wherein in response to the host device being reset, the uni-directional lock clear signal is sent by the host device to the client device; and
wherein when the client device clears the lock, the client device does not undergo a resetting process.

2. A method as recited in claim 1, further comprising:
associating a persistent mark with the protected portion of the client device for the host device to identify the protected portion after the reset of the host device.

3. A method as recited in claim 1, further comprising;
   clearing all locks in the host device and all client devices by the host device.

4. A method as recited in claim 3, wherein the clearing all locks in the host device and all client devices comprises:
   resetting the host device, and
   sending a lock clear signal to all client devices.

5. A method as recited in claim 4, further comprising:
   after the host device has been initialized after the reset, determining a location of the portion of the client device associated with the persistent mark.

6. A method as recited in claim 5, further comprising:
   updating the portion of the client device by the host device.

7. A method as recited in claim 6, further comprising:
   locking the updated portion.

8. A computing system, comprising:
   a client device in communication with a host device wherein the client device is arranged to:
   receive a uni-directional lock clear signal, by way of a lock reset pin, from the host device the uni-directional lock clear signal asserting the lock reset pin;
   triggering a lock clear operation by the assertion of the lock reset pin, the lock clear operation executed only by client device processing, wherein the lock clear operation clears a lock used to prevent modification of data stored in at least a protected portion of the client device, wherein the client device remains fully operational during the lock clear operation;
   wherein in response to the host device being reset, the uni-directional lock clear signal is sent by the host device to the client device; and
   wherein when the client device clears the lock, the client device does not undergo a resetting process.

9. A computing system as recited in claim 8, wherein the host device associates a persistent mark with the protected portion of the client device for the host device to identify the protected portion after the reset of the host device.

10. A computing system as recited in claim 9 wherein the host device clears all locks in the computer system.

11. A computing system as recited in claim 10, wherein all the locks in the computing system are cleared by resetting the host device and sending a lock clear signal to all client devices.

12. A computing system as recited in claim 11 wherein after the host device starts a new session after having been reset, the host device determines a location of the portion of the client device associated with the persistent mark.

13. A computing system as recited in claim 12 wherein the host device updates the portion of the client device associated with the persistent mark.

14. A computing system as recited in claim 13 wherein after the host device updates the portion, the host device protects the updated portion by locking the updated portion as a protected portion.

15. A computing system, comprising:
   a host device;
   a plurality of client devices wherein each of the client devices includes:
   a number of I/O pins selected ones of which are connected to at least one signal line connected to the host device, and
   a first and a second pin wherein all but a first and a last of the plurality of client devices are connected to one another in a daisy chain arrangement by way of the first and the second pin separate from the at least one signal line, wherein at least the first client device is a bootable client device that is connected to the daisy chain arrangement only by way of the second pin, wherein the first pin of the first device is connected to a reset pin of the host computer by way of a reset line, wherein the last client device is connected to the daisy chain only by way of a first pin, wherein a second pin of the last of the plurality of client devices is connected to the host computer by way of an interrupt signal line separate from the at least one signal line,
   wherein when the host device is reset the reset line is asserted, which asserts the first pin of the first client device triggering a lock clear operation, the lock clear operation executed only by processing resources of the first client device, wherein the lock clear operation clears a lock used to prevent modification of data stored in at least a protected portion of the first client device, wherein the first client device remains fully operational and does not undergo any resetting process during the lock clear operation.

16. A computing system as recited in claim 15, wherein the host device associates a persistent mark with the protected portion of the bootable client device for the host device to identify the protected portion after the reset of the host device.

17. A computing system as recited in claim 16 wherein the host device clears all locks in the computer system.

18. A computing system as recited in claim 17, wherein all the locks in the computing system are cleared by placing the host device in a reset state resulting in the host device being reset, which asserts the lock clear pin of the first client device, and wherein the asserting of the lock clear pin of the first client device causes the assertion of the first and second pins of all devices down the daisy chain arrangement, thereby clearing the locks of all devices.

19. A computing system as recited in claim 18 wherein after the host device starts a new session after having been reset, the host device determines a location of the portion of the client device associated with the persistent mark.

20. A computing system as recited in claim 19 wherein the host device updates the portion of the client device associated with the persistent mark.

21. A computing system as recited in claim 20 wherein after the host device updates the portion, the host device protects the updated portion by locking the updated portion as a protected portion.

22. A computing system as recited in claim 18, wherein when the first bootable client device determines that the host device is in the reset state, the first bootable client device commences initializing without being commanded to do so by the host device.

23. A method, comprising:
   at a client device:
   receiving a request from a host device to lock data in the client device and in response generating a lock to prevent modification of data stored in a protected portion of the client device;
   receiving a lock clear signal at a lock reset pin of the client device;
   in response to receiving the lock clear signal, triggering a lock clear operation to clear the lock; the lock clear operation executed only by client device processing resources with the client device remaining fully operational during the lock clear operation without the client device being reset;
   wherein the host device in unable to clear the lock without the host device also being reset; and wherein in response to the host device being reset, the client device is unlocked to permit updates from the host to the protected portion without the client device also being reset.

24. The method of claim 23, further comprising: at the client device associating a persistent mark with the protected portion of the client device that is locked.

25. The method of claim 24, further comprising: receiving a request from the host device to update a portion of the protected portion of the client device after the host device has initialized after the reset of the host device, the host device using the persistent mark to identify the protected portion of the client device.

26. The method of claim 25, further comprising receiving a request from the host device to lock the updated portion and in response locking the updated portion.

27. A computing system, comprising:
 a host device configured to generate a request to lock data in a client device;
 the client device in communication with the host device, the client device having a controller and a data storage area, the client device in response to receiving a lock clear signal at a lock reset pin triggering a lock clear operation to clear a lock used to prevent modification of data stored in a protected portion of the data storage area, wherein the client device remains fully operational during the lock clear operation and the lock clear operation is executed only by client device processing resources;
 the lock clear signal being generated in response to the host device being reset with the client device clearing the lock without the client device being reset;
 wherein the host device in unable to clear the lock without the host device also being reset.

28. A computing system as recited in claim 27, wherein the host device associates a persistent mark with the protected portion of the client device.

29. A computing system as recited in claim 28, wherein after the host device starts a new session after having been reset, the host device determines a location of the portion of the client device associated with the persistent mark.

30. A computing system as recited in claim 29 wherein the host device updates the portion of the client device associated with the persistent mark.

31. A computing system as recited in claim 30 wherein after the host device updates the portion, the host device protects the updated portion by locking the updated portion as a protected portion.

32. A method of protecting client memory from a corrupted host, comprising:
 at a client device:
 receiving a request from a host device to lock data in the client device and in response generating a lock to prevent modification of data stored in a protected portion of the client device;
 receiving a lock clear signal at a lock reset pin of the client device;
 in response to a condition in which the host device enters a corrupted condition, generating a reset of the host device to clear the corrupted condition of the host device and generating a lock clear signal;
 in response to receiving the lock clear signal at the client device, triggering a lock clear operation to clear the lock in the client device; the lock clear operation executed only by client device processing resources with the client device remaining fully operational during the lock clear operation without the client device being reset;
 receiving a request from the host device to update a portion of the client device after the host device has initialized after the reset of the host device to remove the corrupted condition;
 wherein the host device in unable to clear the lock without the host device also being reset.

33. The method of claim 32, further comprising associating a persistent mark to identify the protected portion of the client device that is locked.

34. The method of claim 33, further comprising the host device using the persistent mark after the reset to identify the protected portion.

35. The method of claim 34, further comprising the host device updating after a reset the portion of the client device associated with the persistent mark and protecting the updated portion by locking the updated portion as a protected portion.

* * * * *